US00RE35238E

United States Patent [19]

Pope

[11] E Patent Number: Re. 35,238

[45] Reissued Date of Patent: May 14, 1996

[54] VAPOR RECOVERY SYSTEM FOR FUEL DISPENSER

[75] Inventor: Kenneth L. Pope, Walkertown, N.C.

[73] Assignee: Gilbarco, Inc., Greensboro, N.C.

[21] Appl. No.: 388,168

[22] Filed: Feb. 10, 1995

Related U.S. Patent Documents

Reissue of:

[64] Patent No.: 5,040,577
Issued: Aug. 20, 1991
Appl. No.: 526,303
Filed: May 21, 1990

U.S. Applications:

[63] Continuation of Ser. No. 968,449, Oct. 29, 1992, abandoned.

[51] Int. Cl.[6] ..... B65B 31/00

[52] U.S. Cl. ..... 141/59; 141/7; 141/83; 141/45; 141/51

[58] Field of Search ..... 141/44–46, 51, 141/59, 83, 93, 206, 290, 302, 1, 7

[56] References Cited

U.S. PATENT DOCUMENTS

| | | | |
|---|---|---|---|
| 2,401,124 | 5/1946 | Walker et al. . | |
| 3,016,928 | 1/1962 | Brandt | 141/45 |
| 3,581,282 | 5/1971 | Altman | 340/149 |
| 3,605,824 | 9/1971 | Madden et al. | 141/1 |
| 3,756,291 | 9/1973 | McGahey et al. | 141/45 |
| 3,815,327 | 6/1974 | Viland | 55/80 |
| 3,826,291 | 7/1974 | Steffens | 141/59 |
| 3,850,208 | 11/1974 | Hamilton | 141/59 |
| 3,881,894 | 5/1975 | Onufer | 55/88 |
| 3,899,009 | 8/1975 | Taylor | 141/59 |
| 3,905,405 | 9/1975 | Fowler et al. | 141/46 |
| 3,913,633 | 10/1975 | Hiller | 141/45 |
| 3,915,206 | 10/1975 | Fowler et al. | 141/59 |
| 3,926,230 | 12/1975 | Stary et al. | 141/45 |
| 3,941,168 | 3/1976 | Hiller et al. | 141/46 |
| 3,952,781 | 8/1976 | Hiller et al. | 141/46 |
| 3,981,334 | 9/1976 | Deters | 141/46 |
| 4,009,985 | 3/1977 | Hirt | 431/5 |
| 4,020,861 | 5/1977 | Shibahi | 137/100 |
| 4,047,548 | 9/1977 | Wagner | 141/52 |
| 4,056,131 | 11/1977 | Healy | 141/206 |
| 4,057,085 | 11/1977 | Shihabi | 141/59 |
| 4,057,086 | 11/1977 | Healy | 141/206 |
| 4,058,197 | 11/1977 | Stary et al. | 141/45 |
| 4,063,874 | 12/1977 | Stary et al. | 431/350 |
| 4,068,687 | 1/1978 | Long | 141/59 |
| 4,082,122 | 4/1978 | McGahey | 141/5 |
| 4,095,626 | 1/1978 | Healy | 141/206 |

(List continued on next page.)

FOREIGN PATENT DOCUMENTS

| | | | |
|---|---|---|---|
| 2641267 | 1/1990 | France . | |
| 2817980 | 11/1978 | Germany . | |
| 87 17 378 U | 9/1988 | Germany . | |
| 9007190 | 8/1990 | Germany . | |
| 3903603 | 8/1990 | Germany . | |
| 1199898 | 8/1989 | Japan | 141/94 |
| 2014544 | 8/1979 | United Kingdom . | |
| 2226812 | 7/1990 | United Kingdom . | |
| 2226812A | 11/1990 | United Kingdom . | |

OTHER PUBLICATIONS

Hirt Combustion Engineers (VCS–200 Vapor Net) Jun. 1986 6 pages.

Giulf (VCP System) 6 pages Undated.

Patent Application filed May 7, 1979, No. 36,302 to Walker et al., abandoned file.

Nuovo Pignone Analysis dated Feb. 28, 1989 by Giorgio Bergamini.

*Primary Examiner*—J. Casimer Jacyna
*Attorney, Agent, or Firm*—Kenneth R. Schaefer

[57] ABSTRACT

A system for recovering vapor and liquid emerging from a tank as it is being filled, in which the volumetric flow of a recovery pump that withdraws the vapor through a recovery tube is made equal to the volumetric flow of a fuel delivery pump with a microprocessor. The microprocessor can also modify the volumetric flow of the recovery pump in response to variations in the hydraulic pressure at the inlet side of the recovery pump.

33 Claims, 4 Drawing Sheets

U.S. PATENT DOCUMENTS

| | | | |
|---|---|---|---|
| 4,118,170 | 10/1978 | Hirt | 431/5 |
| 4,153,073 | 5/1979 | Deters | 137/493.4 |
| 4,166,485 | 9/1979 | Wokas | 141/52 |
| 4,167,958 | 9/1979 | Voelz | 141/95 |
| 4,197,883 | 4/1980 | Mayer | 141/59 |
| 4,199,012 | 4/1980 | Lasater | 141/52 |
| 4,202,385 | 5/1980 | Voelz et al. | 141/59 |
| 4,223,706 | 9/1980 | McGahey | 141/59 |
| 4,253,503 | 3/1981 | Gunn | 141/59 |
| 4,256,151 | 3/1981 | Gunn | 141/59 |
| 4,260,000 | 4/1981 | McGahey et al. | 141/59 |
| 4,273,164 | 6/1981 | Gunn | 141/7 |
| 4,292,020 | 9/1981 | Hirt | 431/5 |
| 4,295,505 | 10/1981 | Hasselmann | 141/301 |
| 4,306,594 | 12/1981 | Planck | 141/59 |
| 4,310,033 | 1/1982 | Deters | 141/44 |
| 4,336,830 | 6/1982 | Healy | 141/59 |
| 4,429,725 | 2/1984 | Walker et al. | 141/59 |
| 4,522,237 | 6/1985 | Endo et al. | 141/95 |
| 4,566,504 | 1/1986 | Furrow et al. | 141/59 |
| 4,649,970 | 3/1987 | Bower et al. | 141/302 |
| 4,662,539 | 5/1987 | Komukai | 222/14 |
| 4,680,004 | 7/1987 | Hirt | 431/5 |
| 4,687,033 | 8/1987 | Furrow et al. | 141/59 |
| 4,749,009 | 6/1988 | Faeth | 141/45 |
| 4,790,349 | 12/1988 | Harris | 137/587 |
| 5,005,613 | 9/1991 | Stanley | 141/45 |
| 5,038,838 | 8/1991 | Bergamini et al. | 141/59 |
| 5,123,817 | 6/1992 | Willemson | 417/404 |

VAPOR RECOVERY SYSTEM FOR FUEL DISPENSER

Matter enclosed in heavy brackets [ ] appears in the original patent but forms no part of this reissue specification; matter printed in italics indicates the additions made by reissue.

*This is a continuation of application Ser. No. 07/968,449, filed Oct. 29, 1992, now abandoned.*

RELATED APPLICATION

U.S patent application entitled "Vapor Recovery System For Fuel Dispenser" fled on Dec. 4, 1989, the name of Roger W. Furrow and Kenneth L. Pope, and bearing Ser. No. 07/445,384.

FIELD OF THE INVENTION

The field of the present invention relates generally to fuel dispensers, and more particularly to vapor recovery systems for use when dispensing a volatile fuel such as gasoline.

BACKGROUND OF THE INVENTION

In fuel dispensing systems, such as these used for delivering gasoline to the fuel tank of a vehicle, environmental protection laws require that vapors emitted from the tank during the fuel dispensing process be recovered. Fuel is customarily delivered through a nozzle via a fuel hose and vapors are recovered from the nozzle via a vapor hose that conveys the vapor to the main supply tank from whence the fuel came. In what is referred to as a balanced system, the vapon are forced through the vapor hose by the positive pressure created in the vehicle tank as the fuel enters it. In other systems the vapor is sucked from the vehicle tank by a vapor recovery means connected to the vapor hose and forced into the supply tank.

In some systems, such as that described in the U.S. Pat. No. 4,223,706 to McGahey, mechanical means are used for controlling the relative volumetric flows of the fuel delivered to a nozzle by a fuel delivery means and of the vapor recovered by the suction of a vapor recovery means. In McGahey, the liquid fuel flow itself is used to drive a vapor pump. This usually causes a reduction in the fuel delivery rate which is inconvenient for the user. In U.S. Pat. No. 3,826,291 to Steffens, the vapor pump is calibrated so as to move a volume of vapor essentially equal to the volume of liquid flowing through the meter which measures the flow of fuel.

Unfortunately, these and other systems using mechanical controls generally cannot be adjusted so as to adapt to changing environmental conditions such as changes in temperature and/or to changes in operation. It is also difficult for such systems to accommodate additional controls or features, some of which may not even be known at the time of their manufacture.

BRIEF SUMMARY OF THE INVENTION

In accordance with this invention, the volumetric flow of a vapor recovery means is controlled by programmed micropressor means. Electrical signals are derived that are related in a known way to the volumetric flow of the fuel delivery means and applied to a microprocessor. The microprocessor then determines on the basis of information stored therein the parameters of an electrical signal that can be applied to the vapor recovery means so as to make it have a desired volumetric flow. The volumetric vapor flow can be controlled by adjusting the speed of the motor for the recovery pump contained in the vapor recovery means, by changing its displacement or by controlling the position of a valve or damper in response to the signal from the microprocessor.

If, in accordance with an aspect of this invention, a stepping motor drives the pump for the vapor recovery means, the microprocessor controls the repetition rate of the drive pulses supplied to the stepping motor so as to cause the recovery pump to have the desired volumetric flow. If a different recovery pump or motor is used that requires drive pulses having a different repetition frequency to produce the desired volumetric flow, it is only necessary to make a slight change in the program controlling the microprocessor.

Whereas the volumetric flow of the vapor recovery means may be set equal to the volumetric flow of the fuel delivery means, there are some conditions such as a difference in the temperature of the fuel in the vehicle tank and fuel from the supply tank under which it is desirable to use a volumetric vapor flow that is different from the volumetric fuel flow. In accordance with another aspect of [their] *this* invention, therefore, an indication is derived as to the volumetric vapor flow, and the microprocessor compares this indication with a value of vapor flow that is normally expected and makes the required adjustment.

In one embodiment, a transducer generates an electrical signal correspondling to the hydraulic pressure at the inlet side of the pump for the vapor recovery means. Under average conditions, the pressure will have a desired nominal value. When it is less than this value, the nominal pressure is restored by decreasing the volumetric flow of the vapor recovery means, and when it is greater than this value, nominal pressure is restored by increasing the volumetric flow of the vapor recovery means. The microprocessor is programmed to respond to the signal representing the pressure and provide signals for controlling the volumetric flow of the vapor recovery means. This is particularly easy to do if, in accordance with this invention, the motor driving the recovery pump is of the stepping type because it is driven at a speed determined by the repetition rate of drive pulses, and this can be easily changed.

Vapor recovery systems constructed as briefly described above permit the attainment of faster fuel delivery and greater efficiency, and make it easier to handle the hose. Furthermore, expensive vapor processing units, which are required when the vapor and liquid volumetric flow rates are not the same are not required.

BRIEF DESCRIPTION OF THE DRAWINGS

Various preferred embodiments of the present invention will be described below with reference to the accompanying drawings in which like items are indicated by the same reference designations, and in which.

DETAILED DESCRIPTION OF THE INVENTION

Figure 1:
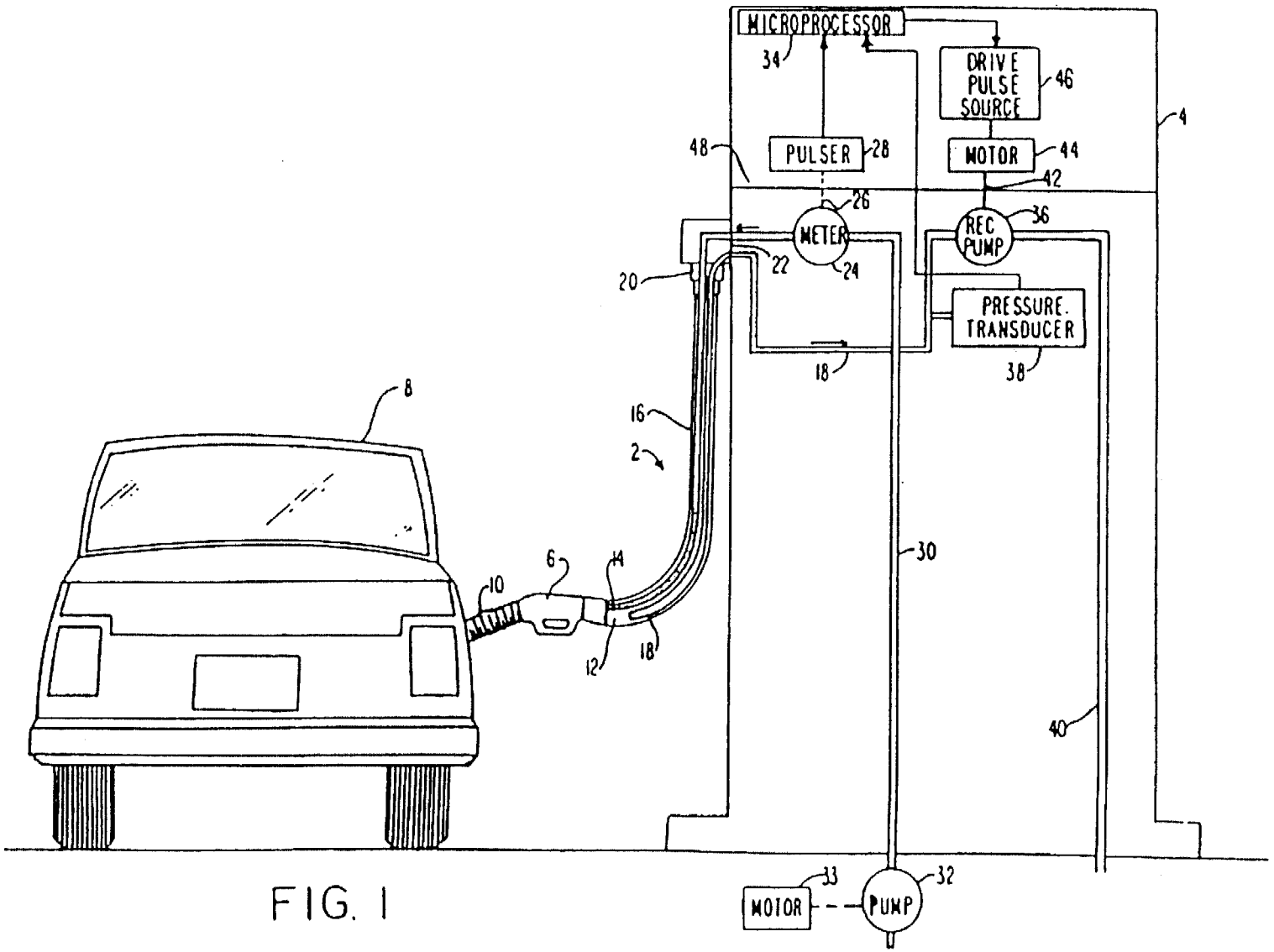
FIG. 1 is a cutaway view of one embodiment of the present invention.

In the embodiment of the invention shown in FIG. 1, a hose 2 extends from a fuel dispensing pump housing 4 to a nozzle 6. Although not shown, the nozzle 6 has an outlet tube that is inserted in the inlet pipe for the gas tank of the automobile 8, and an accordion-like nose 10 that is coaxial with the inlet pipe forms a seal with the pipe so that any liquid and vapor that emanate from the pipe during the dispensing procedure will be conducted to a chamber or space 12 formed between a liquid delivery hose 14 and an outer hose 16 coaxial therewith. As described in U.S. patent application Ser. No. 07/445,384, a liquid and vapor recovery tube 18 is inserted to an expected low point in the chamber or space 12 formed between the delivery hose 14 and the associated outer hose 16. The tube 18 has such a small internal diameter that vapor passes through it with enough velocity to entrain liquid fuel. The end of the hose 16 that is remote from the nozzle 6 is sealed at a coupler 20. The liquid or fuel delivery hose 14 and the vapor recovery tube 18 pass into the pump housing 4 through a wall 22 that seals the end of the hose 16, that is joined to the coupler 20.

Inside the pump housing 4 the liquid delivery hose 14 is connected to a flow meter 24 that is connected via a mechanical connection indicated by a dashed line 26 to a pulser 28. The speed of the flow meter 24 causes the pulser 28 to deliver pulses proportional to the volume of liquid flowing through inner hose 14 to microprocessor 34. The volumetric flow of a fuel delivery pump 32 that pumps fuel from a main supply tank, not shown, via a pipe 30 to the meter 24, is changed as the operator manually changes the opening in the nozzle 6. The pump 32, a motor 33 that drives it, and the manual control just described, constitutes a fuel delivery means.

The vapor recovery tube 18 is coupled to the inlet side of a vapor recovery pump 36, and a transducer 38 produces an electrical signal indicative of hydraulic pressure at that point that is conveyed to the microprocessor 34. Vapor and liquid withdrawn from the chamber 12 via the recovery tube 18 and the recovery pump 36 are conveyed to the underground supply tank, not shown, via a tube 40.

The vapor recovery pump 36 is preferably of the displacement type in which volumetric flow is directly proportional to the speed of operation. The pump 36 is mechanically driven via a shaft 42 by an electrical motor 44 that is preferably of the stepping type. The pump 36 and the motor 44 constitute a vapor recovery means. A drive pulse source 46 supplies drive pulses to the motor 44 at a repetition rate controlled by the microprocessor 34. The housing 4 is divided into upper and lower sections by a vapor barrier panel 48, and the only electrical component below it is the pressure transducer 38 that may easily be made explosion proof.

Figure 2:
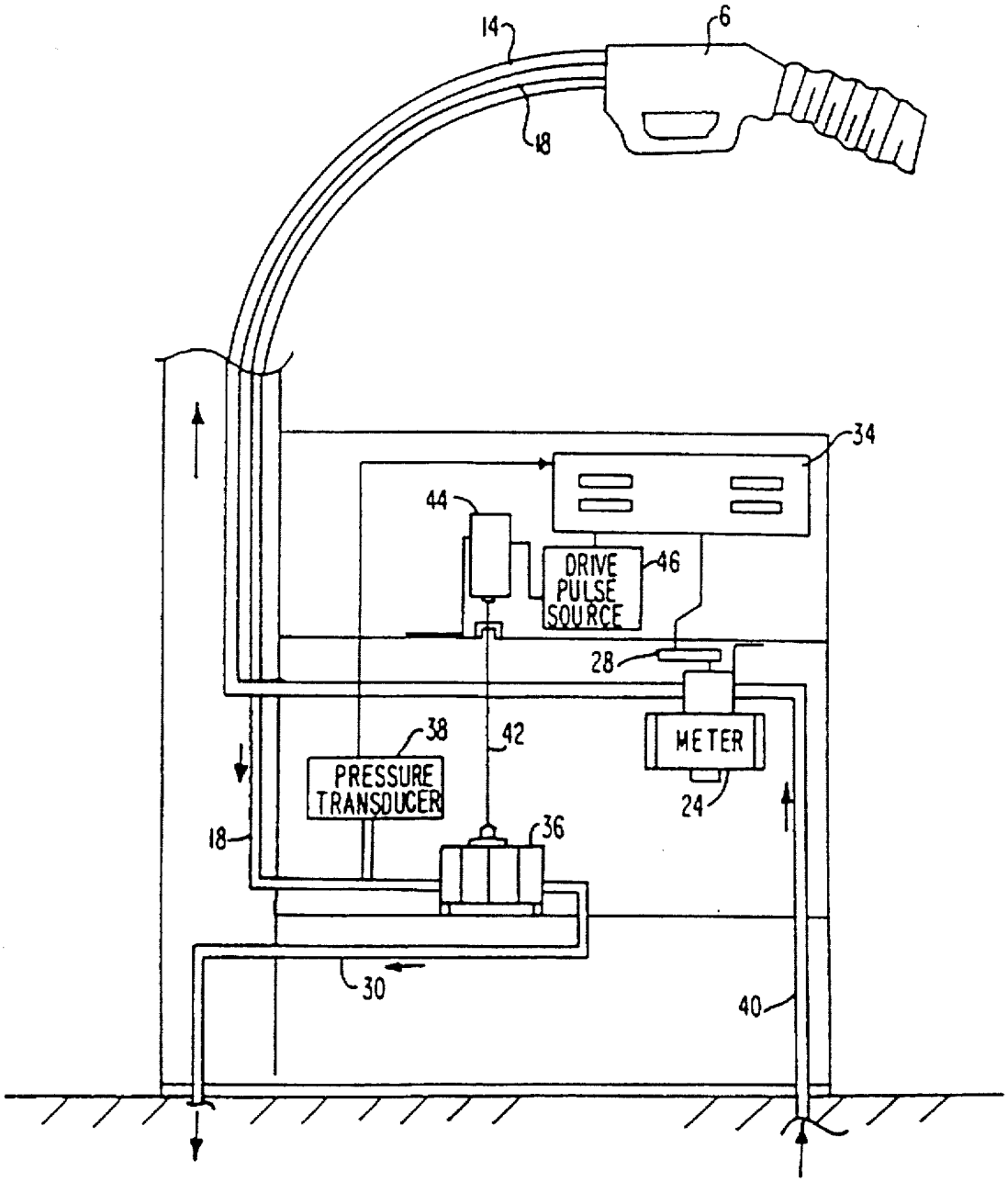
FIG. 2 is a cutaway view of another embodiment of this invention.
Figure 3:
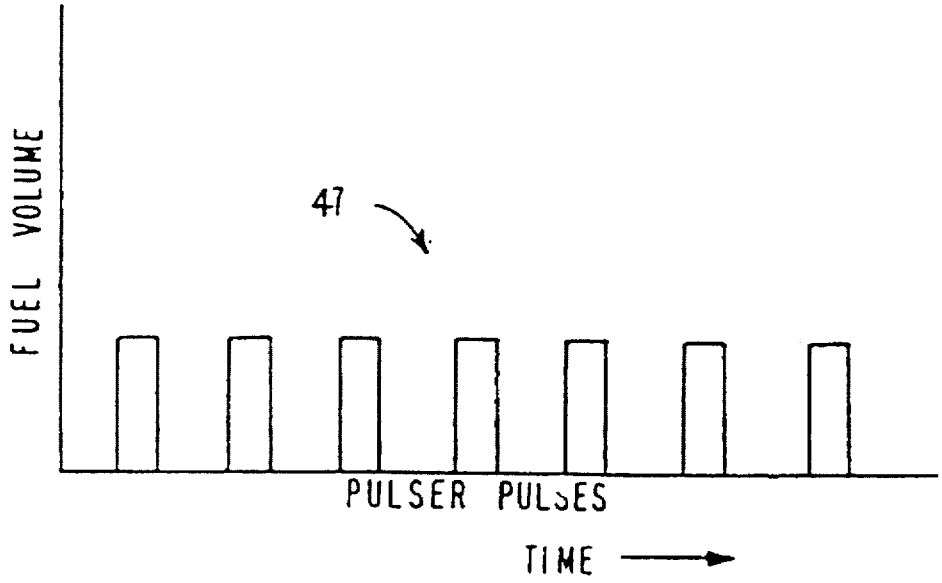
FIG. 3 shows the metering pulses used to indicate the volumetric flow of liquid being dispensed or delivered.
Figure 4:
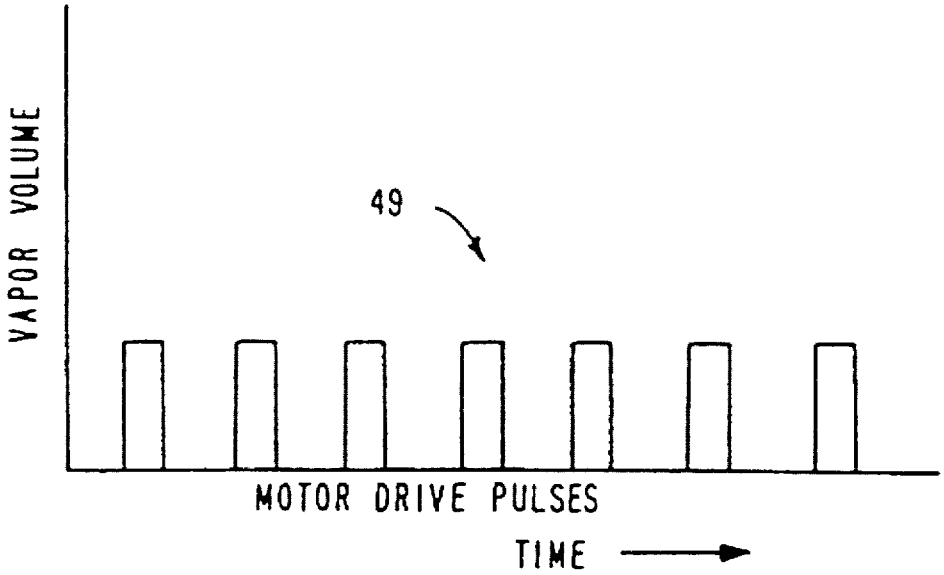
FIG. 4 shows drive pulses used to drive the motor for the recovery pump.

Before discussing how the embodiment of FIG. 1 operates, reference is made to the differences of a very similar embodiment shown in FIG. 2. The principal differences are that the coaxial hose 16 is eliminated so as to make handling easier and that both the liquid delivery hose 14 and the vapor recovery tube 18 extend to the nozzle 6. As seen from the patents referred to, the nozzle 6 contains a chamber, corresponding in function to the chamber 12 of FIG. 1. The recovery tube 18 extends into the low point of the chamber, however formed, and sucks up any vapor or liquid therein. The operation of FIGS. 1 and 2 is as follows. Assume that the signal supplied by the pulser 28 is a series of pulses 47 as shown in FIG. 3, and that they have a repetition rate F proportional to the volumetric flow in the delivery hose 14. Also, assume that a series of pulses 49 shown in FIG. 4 have a repetition rate V that is equal to the repetition rate F. Pulses 49 are applied to the motor 44 for the recovery pump 36 so as to cause the latter to have the same volumetric flow for vapor and entrained liquid as occurs for fuel in the delivery hose 14. The pulses 47 and 49 could have different repetition rates for the same volumetric flow, in which case means for changing the repetition rate of the pulses 49 could be used or the microprocessor 34 could be suitably programmed.

Figure 5:
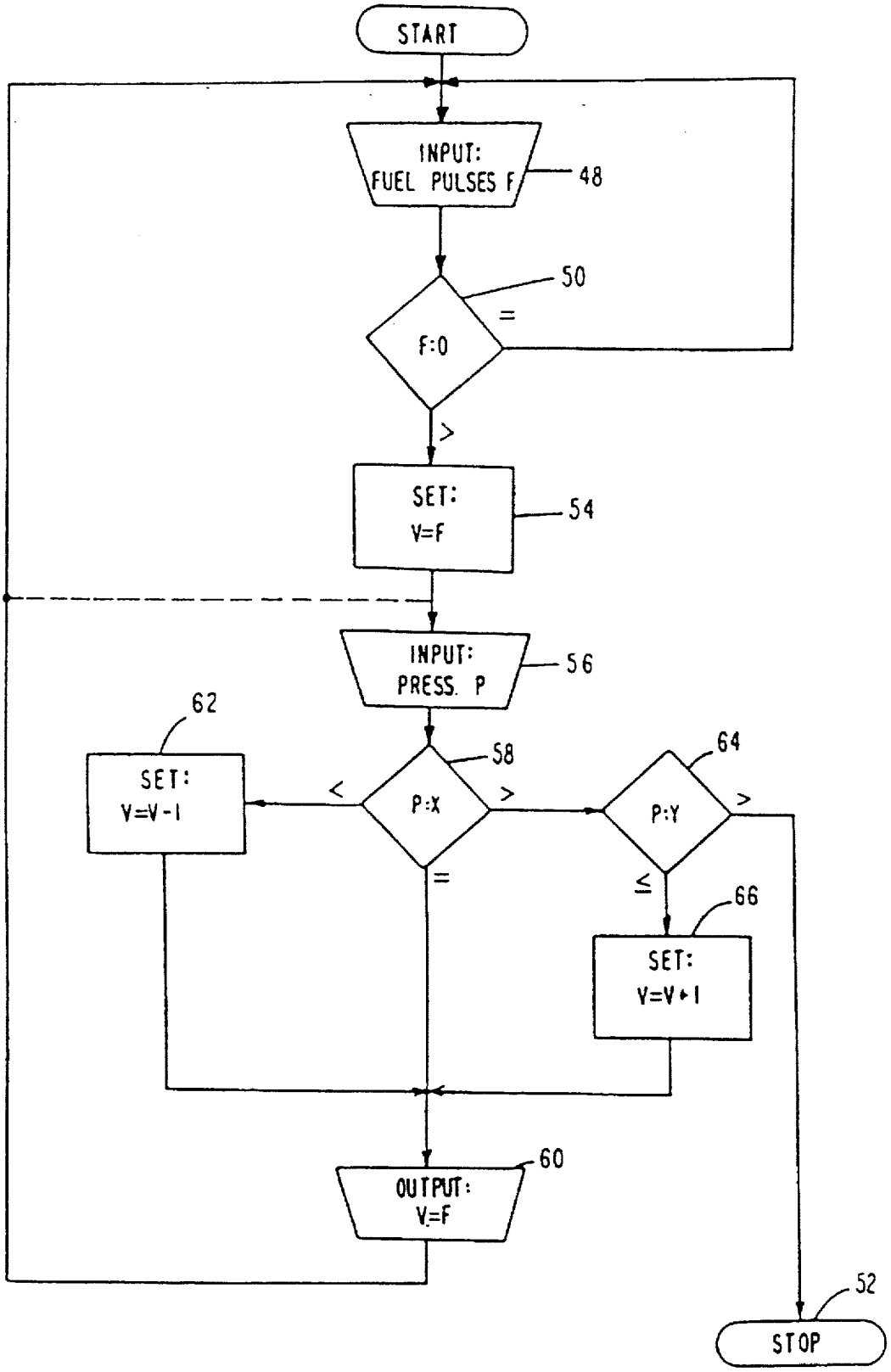
FIG. 5 is a flow chart illustrating the operation of the embodiments of FIG. 1 and FIG. 2.

Reference is now made to the flow chart of FIG. 5 for an explanation of operation. The input fuel pulses 47, step 45, are fed to a decision block 50. If the decision block 50 finds that the repetition rate F is 0, no fuel is being delivered so that no vapor pulses 49 are generated and no vapor is recovered. The procedure then loops back to the beginning of the chart as shown by the feedback. But, if the decision block 50 finds that F>0, the microprocessor 34 causes the drive pulse source 46 to supply drive pulses 49 having a repetition rate V= F (see step 54) to the motor 44 that drives the recovery pump 36. At this point in the process, the volumetric flow of vapor drawn through the recovery tube 18 by the recovery pump 36 is the same as the volumetric flow of liquid fuel via the delivery tube 14 to the nozzle 6. Under some conditions this is satisfactory so that the process reverts to the starting point as [indicted] *indicated* by the dashed line 55.

Whereas the system thus far described works well under some conditions, improved operation is obtained under other conditions by making the volumetric vapor flow greater or less than the volumetric fuel flow. If the temperature of the fuel delivered to the vehicle tank is the same as the temperature of the fuel in the vehicle tank, satisfactory operation may be attained by making the volumetric flow of the vapor recovery means equal to the volumetric fuel flow, but, if for example, the fuel in the vehicle tank is cooler, it will be warmed up as the delivery continues so as to produce more vapor than it would if the temperatures were the same so that the volumetric flow of the vapor recovery means 36, 44 should be increased. The inverse of this situation occurs if the temperature of the fuel in the vehicle tank is warmer than the fuel being delivered.

In the embodiments of the invention shown in FIGS. 1 and 2, a pressure transducer 38 provides a signal P corresponding to the pressure at the inlet of the vapor recovery pump 36. With any given design, P would have a known nominal value X if the volume of vapors emitted from the tank equalled the volume of fuel being delivered, as might be the case if the temperature of the fuel in the vehicle tank and the fuel being delivered were the same. But, if the volume of vapor is greater than the volume of fuel being delivered, the pressure P would be greater than X, and conversely, if the volume of the vapor is less than the volume of the fuel being delivered, P would be less than X. Referring again to [FIG. 3] *FIG. 5*, we find the following.

If P=X, as determined by a decision block 58, the recovery pump 38 is considered to be operating at the correct speed and the repetition rate V is not changed, i.e. V is the output with V=F as in step 60.

If, however, P<X, the recovery pump 36 is running too fast, and the repetition rate V of the drive pulses is reduced, for example, by one pulse a second, step 62, i.e. to (V−1).

In the event that P>X, the pressure P is compared with an excess pressure Y, as indicated in a decision block 64.

If P≦Y, the repetition rate V is increased, for example, by one pulse a second, i.e. to (V+1), step 66, but if P>Y, the dispenser is shut down, via step 52. Thus if P> Y, the dispenser is shut down.

Means other than those illustrated in FIGS. 1 and 2 could be used to carry out the various functions.

The recovery pump could be driven by a D.C. motor rather than a stepping motorin which case the microprocessor 34 could be programmed to provide a signal that would select an appropriate one of a number of different D.C. voltages for application to the motor.

Instead of varying the speed of the motor driving the recovery pump 36, the vapor recovery means 36, 38 could have a valve or damper that is controlled by the microprocessor 34 so as to suck out the desired volume of vapor.

Whereas the use of the pressure P at the inlet of the recovery pump 36 is a satisfactory indication of the flow produced by the vapor recovery means, other indications could be used, e.g. a vapor flow meter could provide electrical signals indicative of the flow.

Although various embodiments of the invention have been illustrated and described herein, they are not meant to be limiting. Modifications to these embodiments may become apparent to those of skill in the art, which modifications are meant to be covered by the spirit and scope of the appended claims. For example, in the coaxial hose, the center hose could be the vapor hose, and the space between the inner and outer hose can be used to convey fuel in a system including the invention.

What we claim is:

1. A fuel delivery system including:

fuel delivery means having a variable volumetric flow;

means for providing an electrical signal indicative of the volumetric flow of said fuel delivery means;

*a* vapor recovery [means] *pump* having a controllable volumetric flow, said vapor recovery [means] *pump* having means for sucking vapor at a first end and for ejecting it at a second end; and means responsive to said electrical signal for making the volumetric flow of said vapor recovery [means] *pump* the same as the volumetric flow of said fuel delivery means.

2. A fuel delivery system as set forth in claim 1 further including:

means for deriving a second electrical signal indicative of the volumetric flow of vapor in said vapor recovery [means] *pump*;

means providing a third electrical signal indicative of the volumetric flow of said vapor recovery [means] *pump* under given conditions;

means for comparing said second and third signals;

means for increasing the volumetric flow of said vapor recovery [means] *pump* if the comparison indicates that the volumetric flow of said vapor recovery [means] *pump* is less than the flow under the given conditions; and means for decreasing the volumetric flow of said vapor recovery [means] *pump* if the comparison indicates that the volumetric flow of said vapor recovery [means] *pump* is greater than the flow under the given conditions.

3. A fuel delivery system as set forth in claim 2 wherein:

the signal indicative of the volumetric flow of said vapor recovery [means] *pump* corresponds to a pressure at the first end of said vapor recovery [means] *pump*.

4. A fuel delivery system as set forth in claim 3, further including:

means for reducing the volumetric flow of said fuel delivery means to zero if the signal representing said pressure exceeds a given value.

5. In a system for delivering vaporizable liquid into an opening of a tank in such manner as to recover liquid and vapor that escapes from the opening, the combination comprising:

a delivery hose;

a nozzle connected to one end of said delivery hose for controlling the flow of said liquid into said tank;

first pumping means coupled to the other end of said delivery hose;

means coupled between said delivery hose and said pumping means for providing a first electrical signal representing the volumetric flow of fuel through said delivery hose;

a recovery hose;

second pumping means coupled to said recovery hose for drawing vapor through said recovery hose;

transducer means coupled to an inlet of said second pumping means for providing a second electrical signal representing a hydraulic pressure in said recovery hose; and control means for said second pumping means including an electrical signal processor, said control means being responsive to said first electrical signal for initially making the volumetric flow of said second pumping means equal to the volumetric flow in said delivery hose and responsive to said second electrical signal for modifying the volumetric flow of said second pumping means as required to maintain said hydraulic pressure in said recovery hose within a given range of values.

6. In a system for delivering liquid into an opening of a tank in such manner as to recover vapor that may emanate from said opening, the combination comprising:

a liquid delivery hose;

a first pump coupled to said delivery hose so as to be capable of forcing a flow of liquid through it;

a recovery hose;

a second pump coupled to said recovery hose so as to be capable of withdrawing a flow of liquid and vapor through it, said second pump having an inlet side;

signalling means for providing an electrical signal indicative of the volumetric flow in one of said hoses; and control means responsive to said signal for controlling the one of said pumps coupled to the other hose in such manner that it produces the same volumetric flow in said other hose as that in said one hose.

7. The combination as set forth in claim 6, wherein:

said signalling means provides an electrical signal in the form of indicator pulses having a repetition rate corresponding to the volumetric flow in said one hose;

a motor for driving the one of said pumps coupled to said other hose, said motor having a speed corresponding to the repetition rate of drive pulses applied to it;

drive means for supplying drive pulses to said motor; and said control means responding to said indicator pulses to make the drive means provide drive pulses having the required repetition rate.

8. The combination as set forth in claim 7, wherein the required repetition rate of drive pulses to said motor is the same as the repetition rate of the indicator pulses.

9. The combination as set forth in claim 6, further comprising:

means coupled to an inlet side of said second pump for providing a second signal indicative of the pressure thereat; and means for maintaining the volumetric flow of said second pump at the same value if the second signal indicates that the pressure equals a nominal value.

10. The combination as set forth in claim 6, further comprising:

means coupled to an inlet side of said second pump for providing a second signal indicative of the pressure thereat; and means responsive to said second signal for reducing the volumetric flow of said second pump if the second signal indicates a pressure less than a nominal value.

11. The combination as set forth in claim 6, further comprising:

means coupled to an inlet side of said second pump, for providing a second signal indicative of the pressure thereat; and means responsive to said second signal for increasing the volumetric flow of said second pump if the second signal indicates a pressure greater than a nominal value and less than an excessive value.

12. The combination as set forth in claim [7] *10*, [further comprising means for preventing] *wherein said control means prevents* delivery of liquid if [a second signal indicates a pressure] *said pressure is* greater than an excessive value.

13. In a system for delivering vaporizable liquid into an opening of a tank in such manner as to recover liquid vapor that may emanate from said opening during delivery, the combination comprising:

a liquid delivery hose;

a liquid delivery pump coupled to said delivery hose;

metering means coupled to one of said delivery hose and said delivery pump for providing pulses occurring at a repetition rate corresponding to the volumetric flow of liquid through said delivery hose; *a* recovery hose for liquid and vapor;

a recovery pump, a motor coupled to drive said recovery pump, said recovery pump producing a volumetric flow through said recovery hose corresponding to a repetition rate of drive pulses applied to said motor;

a source of drive pulses that may be varied in repetition rate coupled to said motor; and processor control means responsive to the pulses provided by said means for metering, for controlling the repetition rate of drive pulses provided by said source of drive pulses so as to cause said recovery pump to have the same volumetric flow as said liquid delivery pump.

14. In a system for delivery vaporizable liquid into an opening of a tank in such manner as to recover liquid and vapor that may emanate from said opening during delivery, the combination comprising:

a liquid delivery hose;

a pump coupled to said delivery hose so as to be capable of forcing a flow of liquid through it;

a vapor recovery hose;

a pump coupled to said vapor recovery hose so as to be capable of withdrawing a flow of vapor and liquid through it;

means for providing an electrical signal indicative of the volumetric flow in said delivery hose; and means responsive to said signal for controlling said recovery pump in such manner that it produces a flow in said recovery tube having the same volumetric rate as the volumetric rate in said delivery hose.

15. In a system for delivering vaporizable liquid into an intake pipe of a tank in such manner as to [recovery] *recover* fumes or liquid emanating thereform during the delivery process, the combination comprising:

a liquid delivery hose;

means coupled to said delivery hose for providing electrical indication of the volumetric flow through it;

a chamber for collecting any fumes or liquid emanating from the intake pipe when coupled thereto;

a recovery tube communicating with said chamber;

a recovery pump of the displacement type, communicating with said recovery tube; and means responsive to said electrical [indications] *indication* for driving said recovery pump at a speed such that it has a derived volumetric flow as the volumetric flow in said delivery tube.

*16. A fuel delivery system including:*

*fuel delivery means having a variable volumetric flow;*

*means for providing an electrical signal indicative of the volumetric flow of said fuel delivery means;*

*a vapor recovery means having a controllable volumetric flow, said vapor recovery means having a variable speed pump for sucking vapor at a first end and for ejecting it at a second end;*

*and means responsive to said electrical signal for driving the pump at a speed to make the volumetric flow of said pump be derived from the volumetric flow of said fuel delivery means.*

*17. A fuel delivery system as claimed in claim 16 further comprising a fuel dispenser housing and wherein said fuel delivery means includes a liquid fuel delivery path including a pump to pump liquid from a fuel reservoir along said path to a hose for conveying liquid which is attached to said housing and which terminates in a nozzle, and*

*a vapor recovery path including a vapor recovery hose portion located within said liquid-conveying hose from said nozzle to said housing so that the space between the vapor recovery hose and the liquid-conveying hose can be used to convey liquid fuel from said housing to said nozzle, as vapor is returned from said nozzle to said housing.*

*18. In a system for delivering vaporizable liquid into an intake pipe of a tank in such manner as to recover fumes or liquid emanating therefrom during the delivery process, the combination comprising:*

*a liquid delivery hose terminating in a nozzle;*

*means coupled to said delivery hose for providing an electrical indication of the volumetric flow through said delivery hose;*

*an intake port in said nozzle for collecting any fumes emanating from the intake pipe when coupled thereto;*

*a recovery tube communicating with said intake port;*

*a recovery pump communicating with said recovery tube;*

*and means responsive to said electrical indications for driving said recovery pump at a speed such that it has a volumetric flow derived from the volumetric flow in said delivery hose.*

*19. A vapor recovery fuel dispenser comprising*

*a liquid fuel delivery means including means for monitoring the flow rate of the liquid fuel being delivered and outputting a control signal indicative of the liquid flow rate,*

*a vapor recovery apparatus including a vapor recovery line through which vapor to be recovered is transported and a variable speed pump to pump vapor through said vapor recovery line, and*

*an electrical control for said variable speed pump to control the speed of said pump and, in turn, the rate of vapor pumping to correlate with said control signal indicative of the liquid flow rate.*

*20. A method of liquid fuel delivery including:*

*delivering fuel with a variable volumetric flow;*

*providing an electrical signal indicative of the volumetric flow of the fuel delivery;*

*withdrawing vapor at a first end of a pump driven by a variable speed motor having a controllable volumetric flow and ejecting it at a second end; and*

*controlling the volumetric flow rate of the vapor as derived from the electrical signal by controlling the speed of the motor.*

*21. A fuel delivery method as claimed in claim 20 comprising the preliminary step of providing a coaxial hose having inner and outer pathways through which to deliver fuel and withdraw vapor and*

*said fuel delivering step comprises delivering the fuel through the outer pathway of the coaxial hose, and*

*said vapor withdrawing step comprises withdrawing the vapor through the inner pathway of the coaxial hose.*

*22. In a process for delivering vaporizable liquid into an opening of a tank in such manner as to recover vapor that may emanate from the opening, the combination comprising:*

*pumping a flow of liquid through a delivery hose with a first pump;*

*withdrawing a flow of vapor through the recovery hose with a second pump driven by a motor to produce a volumetric flow through the recovery hose corresponding to a signal applied to the motor;*

*providing pulses occurring at a repetition rate corresponding to the volumetric flow of liquid through the delivery hose; and*

*controlling the signal applied to the motor responsive to the pulses, to cause the recovery pump to have a volumetric flow derived from the volumetric flow of the liquid delivery pump.*

*23. A fuel delivery system including:*

*fuel delivery means having a variable volumetric flow;*

*means for providing an electrical signal indicative of*

*the volumetric flow of said fuel delivery means; vapor recovery means having a controllable volumetric flow, said vapor recovery means having a positive displacement pump and a variable speed motor arranged to drive said positive displacement pump for sucking vapor at a first end and for ejecting it at a second end; and*

*a controller responsive to said electrical signal for making the speed of said motor be derived from a value of the volumetric flow of said fuel delivery means without withdrawing excess air.*

*24. A fuel delivery system as claimed in claim 23, wherein said vapor recovery means includes a variable speed vapor pump capable of pumping a variable volumetric rate of vapor and said controller varies the pumping speed of the pump.*

*25. A fuel delivery system including:*

*a dispensing nozzle having a gas outlet and a vapor inlet;*

*a fuel conduit connecting the gas outlet of the dispensing nozzle to a fuel supply;*

*a fuel pump for delivering fuel to the dispensing nozzle through the fuel conduit;*

*a flow meter disposed in the fuel conduit for sensing the flow rate of the fuel and for generating an electrical signal indicative of the flow rate of the fuel;*

*a controller operatively connected to the flow meter for generating a control signal derived from the electrical signal from the flow meter;*

*a vapor conduit connected to the vapor inlet of the nozzle for directing vapor from the dispensing nozzle;*

*a variable flow control unit including a vapor pump for drawing vapor through the vapor conduit; and*

*a stepper motor operatively connected to the flow control unit and responsive to the control signal from the controller for controlling the flow rate of the vapor through the flow control unit.*

*26. The fuel delivery system of claim 25 wherein the stepper motor drives the vapor pump and is operative to vary the speed of the vapor pump in response to the control signal.*

*27. The fuel delivery system as claimed in claim 25 wherein the variable flow control unit withdraws vapor without air.*

*28. A method of delivering fuel including:*

*pumping fuel from a fuel supply through a conduit and out of a nozzle having a fuel outlet and a vapor inlet;*

*returning vapor from the vapor inlet of the nozzle though a vapor conduit*

*sensing the flow rate of the fuel through the conduit to generate an electrical signal indicative of the flow rate of the fuel;*

*generating a control signal derived from the electrical signal;*

*drawing vapor through the vapor conduit; and*

*actuating a stepper motor responsive to the control signal to control the flow rate of the vapor through the flow control unit.*

*29. The fuel delivery method of claim 28 wherein the actuation of the stepper motor drives a vapor pump to vary the speed of the vapor pump in response to the control signal.*

*30. The fuel delivery method as claimed in claim 28 wherein the vapor drawing step withdraws vapor without air.*

*31. A fuel delivery system comprising:*

*a dispensing nozzle having a liquid fuel inlet, a liquid fuel outlet, a vapor inlet and a vapor outlet;*

*a first conduit having a first end adapted for connection to a fuel pump associated with a fuel storage tank and a second end at said liquid fuel inlet of said nozzle;*

*a vapor pump having a vapor inlet and a vapor outlet;*

*a second conduit operatively connected between said nozzle vapor outlet and the vapor inlet of said vapor pump;*

*a third conduit having a first end operatively connected to said vapor outlet of said vapor pump and a second end adapted for connection to said fuel storage tank;*

*a means for providing electrical signals respresentative of fuel flow rate through said first conduit, and*

*drive means operatively connected to said vapor pump so as to drive it to produce a desired vapor flow rate in response to said electrical signals derived from said means for providing electrical signals.*

*32. In a system for delivering vaporizable liquid into an intake pipe of a tank in such manner as to recover fumes emanating from the tank during the delivery process, the combination comprising:*

*a liquid delivery path terminating in a nozzle;*

*a meter coupled to said delivery path and driving a pulser that generates pulses indicative of the volumetric flow through said delivery path;*

*an intake port in said nozzle for collecting fumes emanating from the intake pipe when coupled thereto;*

*a recovery path communicating with said intake port;*

*an electrically driven variable speed vapor pump arranged to pump vapor along said recovery path; and*

*a control responsive to said pulses and outputting an electrical signal to drive said variable speed pump at a speed such that it has a volumetric flow derived from the volumetric flow in said delivery path.*

*33. A vapor recovery fuel dispenser comprising*

*a liquid fuel delivery apparatus including a device that monitors the flow rate of the liquid fuel being delivered and outputs a first control signal indicative of the liquid flow rate,*

*a vapor recovery apparatus including a vapor recovery line through which vapor to be recovered is transported and a variable speed pump to pump vapor through said vapor recovery line,*

*a sensor that monitors the vapor being recovered and outputs a second control signal affected by the vapor flow rate, and*

*a control for said variable speed pump to control the rate of vapor pumping to correlate with said control signal indicative of the liquid flow rate and to compensate for deviations indicated by said second control signal.*

* * * * *